United States Patent
Qian

(10) Patent No.: US 11,413,895 B2
(45) Date of Patent: Aug. 16, 2022

(54) PRINTING IMAGES FOR VARIABLE LIGHTING CONDITIONS

(71) Applicant: Hewlett-Packard Development Company, L.P., Spring, TX (US)

(72) Inventor: Li Qian, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 42 days.

(21) Appl. No.: 17/049,749

(22) PCT Filed: Jun. 15, 2018

(86) PCT No.: PCT/US2018/037729
§ 371 (c)(1),
(2) Date: Oct. 22, 2020

(87) PCT Pub. No.: WO2019/240809
PCT Pub. Date: Dec. 19, 2019

(65) Prior Publication Data
US 2021/0368071 A1    Nov. 25, 2021

(51) Int. Cl.
*B41M 3/00* (2006.01)
*B41J 29/393* (2006.01)
*B41J 2/21* (2006.01)
*G01J 3/50* (2006.01)
*H04N 1/60* (2006.01)

(52) U.S. Cl.
CPC ............ *B41M 3/008* (2013.01); *B41J 29/393* (2013.01); *G01J 3/501* (2013.01); *H04N 1/6086* (2013.01); *H04N 1/6088* (2013.01); *B41J 2/2117* (2013.01); *B41J 2029/3935* (2013.01)

(58) Field of Classification Search
CPC ........ B41M 3/008; B41M 3/06; B41J 29/393; B41J 2/2117; B41J 2029/3935; G01J 3/501; H04N 1/6086; H04N 1/6088; G06F 3/1208; G06F 3/1247; G06F 3/125; G09F 13/02; G09F 13/04
See application file for complete search history.

(56) References Cited

U.S. PATENT DOCUMENTS 5,714,291 A    2/1998   Marinello
7,419,272 B2   9/2008   Schenke et al.
(Continued)

FOREIGN PATENT DOCUMENTS

WO   WO-2013138486         9/2013
WO   WO-2017111913 A1      6/2017

*Primary Examiner* — Yaovi M Ameh
(74) *Attorney, Agent, or Firm* — HP Inc. Patent Department

(57) ABSTRACT

In an example there is provided a printing method comprising receiving first and second image data for first and second images to be printed on a substrate, determining first print data for the first image on the basis of the first image data and a white layer to be printed between the first image and second image, to achieve a nominal color profile for the first image; determining second print data for the second image on the basis of the first image data, second image data, the white layer and one or more properties of the substrate to achieve a nominal color profile for the second image; communicating the print data for the first and second images to a printing device to print the first and second images and white layer on the substrate.

12 Claims, 4 Drawing Sheets

(56) References Cited

U.S. PATENT DOCUMENTS

| | | | |
|---|---|---|---|
| 9,945,539 B1 | 4/2018 | Su et al. | |
| 2003/0169421 A1 | 9/2003 | Ehbets | |
| 2004/0233465 A1 | 11/2004 | Coyle | |
| 2013/0241988 A1 | 9/2013 | Mills | |
| 2013/0264813 A1* | 10/2013 | Quinn | G02B 5/223 |
| | | | 283/67 |
| 2014/0126001 A1 | 5/2014 | Nudurumati et al. | |
| 2015/0360489 A1 | 12/2015 | Davidson | |
| 2017/0034398 A1* | 2/2017 | Garcia Garcia | H04N 1/00034 |
| 2017/0223197 A1 | 8/2017 | Derhak et al. | |

* cited by examiner

PRINTING IMAGES FOR VARIABLE LIGHTING CONDITIONS

BACKGROUND

Advertisements and signs displayed in public places are often illuminated so that they may be visible at night time as well as during the day. For example, road signs and emergency signs that convey important information are often backlit so that they are still visible at night time or in poor lighting conditions. Color properties of the displayed image such as the hue and saturation may change when the image is backlit in contrast to when the image is illuminated in natural light settings. The visual experience of the viewer is enhanced by ensuring consistency of color properties of an image where the image is to be displayed under variable lighting conditions.

BRIEF DESCRIPTION OF THE DRAWINGS

Various features of certain examples will be apparent from the detailed description which follows, taken in conjunction with the accompanying drawings, which together illustrate, by way of example only, a number of features, wherein.

DETAILED DESCRIPTION

Figure 1A:
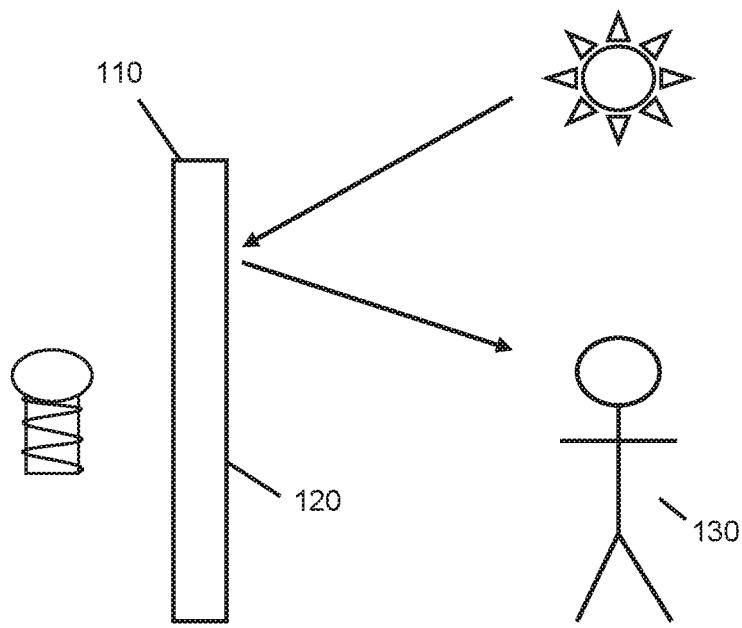
FIG. 1A is a block diagram showing a sign in reflective lighting conditions according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In general, color attributes of an image vary when the image is displayed under reflective lighting i.e. light that is reflected off the image, in contrast to when the image is displayed under transmissive lighting i.e. light that is transmitted through the image.

Often, it is desirable that images that are displayed to the general public are viewable under variable lighting conditions. For example, advertisements displayed on billboards may be backlit so that the content displayed on the billboard is viewable at night time as well day time. Signs may be illuminated for other reasons. For example, fire exits in buildings are often indicated by backlit signs to help people navigate in the dark towards the fire exit. However, these signs should also easily be viewable in day light conditions. In these examples, it is desirable that the image being displayed is equally visible in different lighting conditions. In other examples, signs are designed to display distinct images depending on the lighting conditions in which the sign is being viewed. In some cases, variable lighting conditions can be used to enhance the image to produce special effects that are only visible when the sign is backlit.

When an image is printed on the surface of a substrate such as paper or glass, the color properties of the image when the substrate is backlit may be worse than when the image is viewed in normal day light conditions. Single-sided printing of an image on a substrate can result in the colors of the image having a "washed out" appearance when backlit. Alternatively, the image may appear oversaturated when viewed in normal light, if the image has deliberately been modified for optimal backlighting conditions. A problem therefore arises in achieving consistent colorimetry for images that are to be displayed in variable lighting conditions.

Double-sided printing is used in certain cases to achieve an improved consistency of colorimetry attributes of images, such as hue, saturation and lightness, under variable lighting conditions. In this case, the image that is printed on the reverse side of the substrate should line up with the image printed on the front side of the substrate. A small defect of even a few millimetres can lead to visible defects such as blurriness and non-sharpness in the final printed output leading to a degradation of image quality.

The methods and systems described herein can be used to produce a print on a substrate that has good colorimetry consistency when viewed under both day reflexive lighting conditions, in which light is reflected off the surface of the substrate, and transmissive lighting conditions, in which light is transmitted through the substrate. In particular, the methods and systems described herein can be used to achieve a nominal color profile for an image displayed on the substrate when viewed under reflexive lighting conditions. Similarly, the methods and systems described herein are used to achieve a nominal color profile for a second image on the substrate when viewed under transmissive lighting conditions in which light is transmitted through the substrate. Herein a "nominal" color profile is a specification of values of colorimetry attributes of an image such as hue, saturation and lightness.

In contrast to other methods, rather than printing on either side of the substrate the second image that is visible in transmissive lighting conditions is printed on the same face of the substrate as the first image that is visible in reflexive lighting conditions. A white layer is printed between the two images with the second image being printed on the surface of the substrate first, followed by the white layer, followed by the first image on top of the white layer. This has a similar effect to double-sided printing without the aforementioned defects that arise from misaligned images.

In methods and examples described herein, print data to reproduce the images on the substrate is generated on the basis of image data for the images, the white layer, and in the case of the second image, properties of the substrate. The printed output achieves nominal color profiles for the first and second images in a manner which takes into account the properties of the substrate on to which the image is being printed. Overall, the printed output is viewable in both reflexive and transmissive lighting conditions and the colorimetry attributes are maintained under both lighting conditions, taking into account properties of the media onto which the images are printed.

FIG. 1A is a simplified schematic diagram showing illumination of a sign 110 under reflective lighting conditions. In FIG. 1A the sign 110 is displayed in day light. During daylight hours light is reflected off the surface 120 of the substrate which is displayed to a viewer 130. The viewer 130 is able to identify the image displayed on the sign 110 because of the illumination of the sign 110 by the sunlight.

Figure 1B:
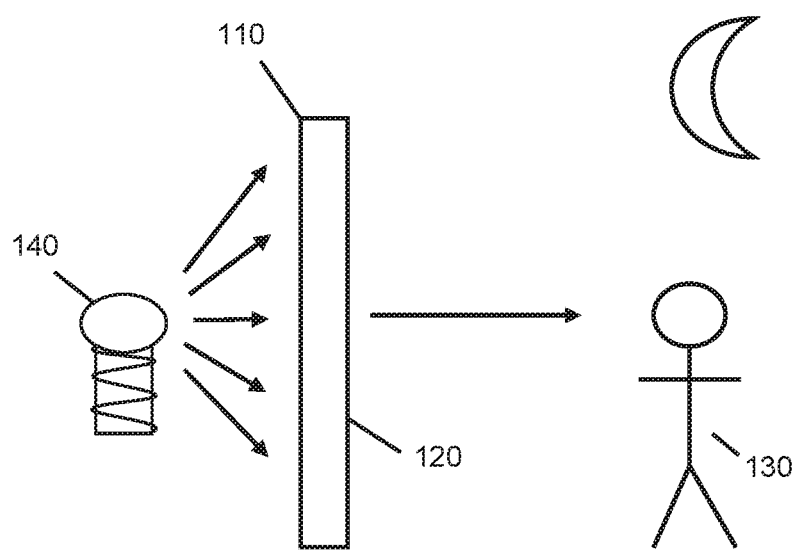
FIG. 1B is a block diagram showing a sign in transmissive lighting conditions, according to an example.

FIG. 1B is a simplified schematic diagram showing illumination of the same sign 110 under transmissive lighting conditions. In this case, an artificial light 140 shines light onto the reverse of the sign 110 which illuminates the substrate 120 from the rear side. In this case, the viewer 130 is able to see a differing view of the image or images displayed on the surface 120 of the substrate under transmissive lighting conditions. As describe herein, the colorimetry between the images displayed on the surface 120 varies according to whether the lighting conditions are transmissive or reflective. Moreover, the colorimetry of the images displayed on the substrate will vary depending on the type of substrate the images are printed on.

Figure 2:
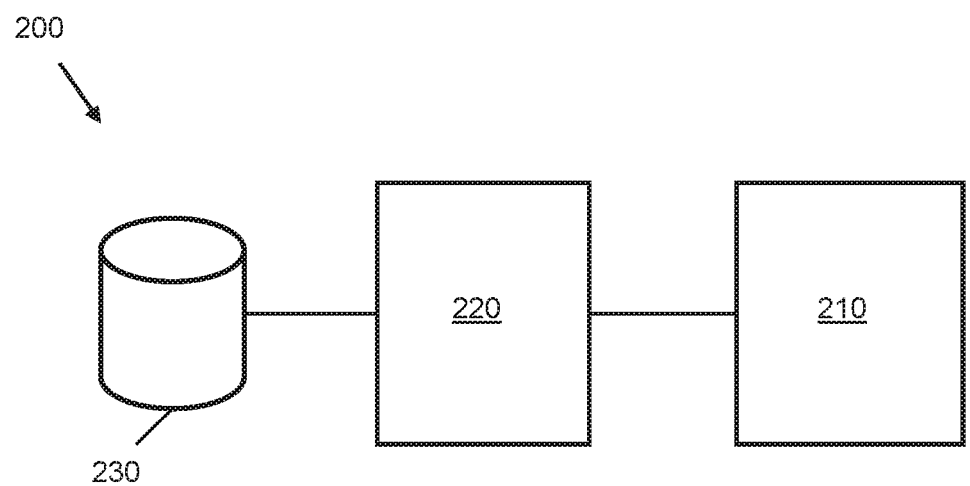
FIG. 2 is a block diagram showing a printing device according to an example.

FIG. 2 is a simplified schematic diagram showing a printing apparatus 200 according to an example. In FIG. 2 there is shown a printing device 210. The printing device 210 is, in certain examples, an inkjet or laser printing device.

The printing device 210 is coupled to a print controller 220. In certain examples the print controller 220 is implemented in firmware in the printing device 210. In another case the printing device 210 is communicatively coupled to a computing device which executes the print controller 220 in software. In other cases, the print controller 220 is implemented in hardware of in software in a separate hardware module. In another case, the printing device 210 is one of a number of printing devices controlled by the single print controller 220. The single print controller 220 may control a plurality of individual printing devices in, for example, an industrial setting such as large printing press factories. In some examples, the print controller 220 is in remote communication with the printing device 210 such as over a network.

The print controller 220 is arranged to communicate print data to the printing device 210. Print data is communicated to the printing device 210 to control the printing operations of the printing device 210. For example, in the case that the printing device 210 is an ink jet printing device, the print data may comprise control data to control the deposition of ink on a substrate. The print data actuates the print nozzles of the printing device 210 to deposit ink at particular times as the substrate is passed through the printing device 210.

In examples where the printing device 210 is a laser printing device, the print data may, for example, comprise control data to control the firing of a laser in the printing device 210. The targeted firing of a laser at particular locations on the substrate, causes the substrate surface to become electrostatically charged at specific regions. The electrostatically charged attract charged ink particles when the substrate passes through an ink depositor in the printing device 210 to reproduce the image, according to the image data.

In the example shown in FIG. 2, the print controller 220 is communicatively coupled to a data storage container 230. The data storage container 230 contains image data. According to examples described herein, the data storage container 230 is a hardware storage container on a computing device such as hard disk or flash drive. In other cases, the data storage container 230 is a remote repository of image data. Image data, as referred to herein, comprises data that, when displayed on an imaging device, corresponds to an image. Image data may be stored in any number of formats in the data storage container 230. For example, the image data may be stored in raster graphics or bitmap image as a dot matrix data structure, representing a generally rectangular grid of pixels, or points of color, viewable via a monitor, paper, or other display medium.

According to examples described herein, the image data stored in the data storage container 230 further comprises color profile data. According to examples herein, color profile data comprises a plurality of values of colorimetry attributes including specification of the saturation, color brightness and hue of each pixel of an image, in the case where an image is stored as a bitmap.

In examples, the image data comprises a "nominal" color profile for the image it represents. The nominal color profile specifies values for color attributes of the image, when viewed under specific lighting conditions. The print controller 220 is arranged to obtain image data from the data storage 230. According examples, image data is communicated between the data storage 230 to the print controller 220 on request from the print controller 220.

The print controller 220 is arranged to obtain image data for a first and second image, where the first image, when printed on a substrate by the printing device 210, is visible when the substrate is viewed under reflective lighting conditions, and the second image, when printed on the substrate, is visible when the substrate is viewed under transmissive lighting conditions.

According to examples herein, the print controller 220 is arranged to generate print data for the first image on the basis of the first image data. Print data may be generated by determining locations on the substrate at which is to be deposited to generate a reproduction of the image according to the image data. Print data also specifies the quantities and combinations of ink types to achieve the nominal color profile at a location. The print controller 220 is arranged to communicate the print data to the printing device 230.

According to examples, the printing device 210 is arranged to print the images on the substrate. In particular, the print data is arranged to control the printing device 210 to print the second image first, on the substrate, followed by the white layer, and then finally the first image on the white layer where the resulting compound image is viewable under reflective and transmissive lighting conditions such as daytime conditions and night-time conditions where the substrate is backlit to display the second image. In some examples, the first image is identical to the second image.

Figure 3:
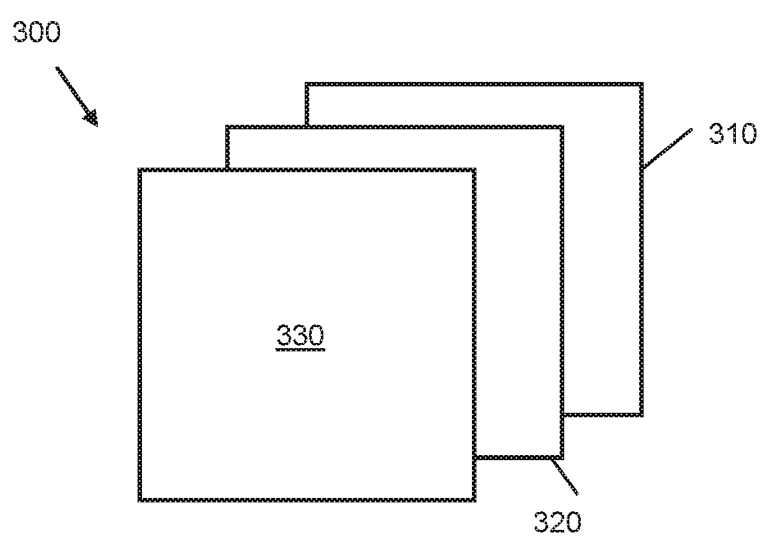
FIG. 3 is a block diagram showing layers of a printed output on a substrate.

FIG. 3 is a schematic diagram showing the layers of a printed output 300 of from the printing device 210, according to an example. In FIG. 3, the bottom layer, 310 which is the first layer that is printed on the substrate (not shown in FIG. 3), corresponds to the second image. This is the image that appears when the substrate is viewed under transmissive conditions. For example, if the substrate is backlit. The next layer 320 is a white layer. The white layer is printed on top of the bottom layer 310 between the bottom layer 310 and the top layer 330. The white layer 320 is similar in nature to the role of the substrate for double-sided printing where a first and second image are printed on either side of the substrate. As in the case of the substrate in double-sided printing, the the white layer reflects a significant proportion of the light in the case of reflective illumination of the top layer image as shown in FIG. 1A and transmits only a portion of the light in the case of transmissive illumination of the substrate as shown in FIG. 1B. In FIG. 3, the top layer 330, which is printed on top of the white layer 320 corresponds to the first image. As described herein, the top layer image is viewable in reflective lighting conditions.

Figure 4:
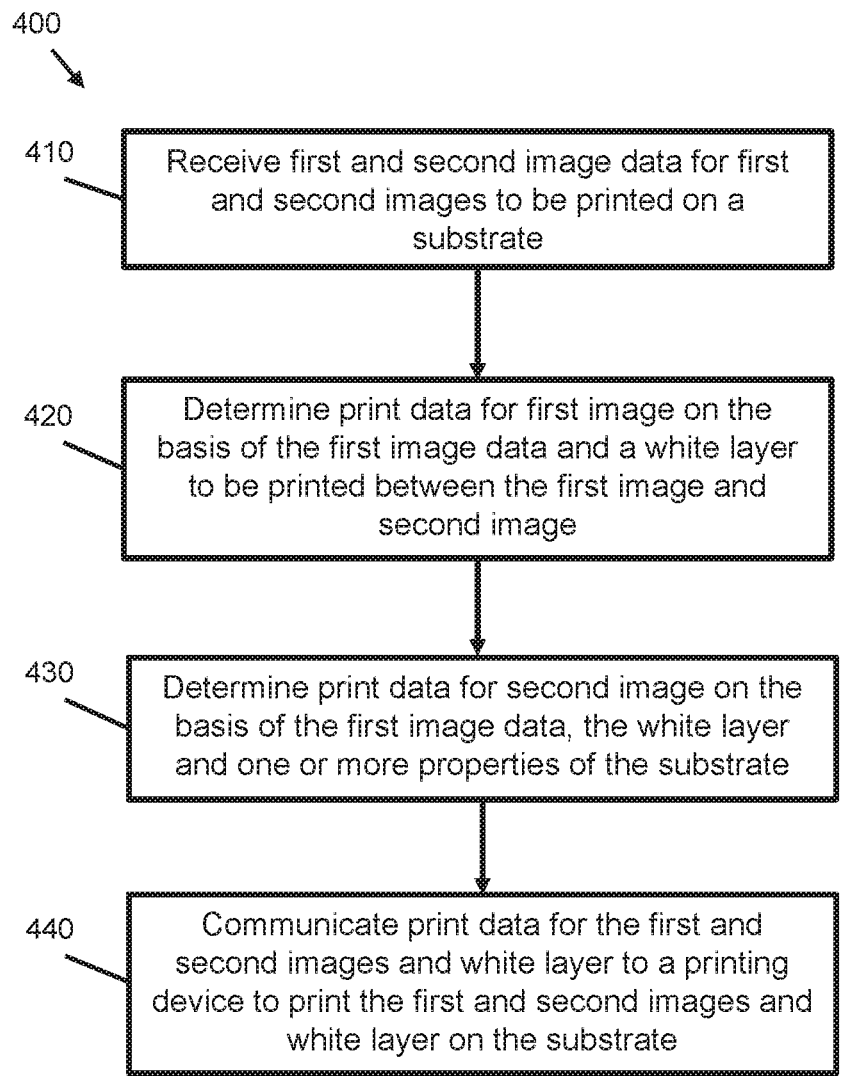
FIG. 4 is a diagram showing a flow chart showing a method for printing on a substrate, according to an example.

FIG. 4 is a diagram showing a flow chart showing a method 400 for printing on a substrate, according to an example. The method 400 may be implemented in conjunction with the apparatus described herein. In particular the method 400 is implemented on the print controller 210 shown in FIG. 2.

At block 410 first and second image data for first and second images to be printed on a substrate are received. The first image data specifies a nominal color profile of the first image visible on the substrate when the substrate is viewed under reflective lighting conditions and the second image data specifies a nominal color profile for the second image visible on the substrate when the substrate is viewed from the same face of the media under transmissive lighting conditions. According to an example, the nominal color profile specifies one or more colorimetry attributes. The colorimetry attributes may comprise one or more of: saturation, color brightness and hue.

At block 420, first print data for the first image is determined on the basis of the first image data and a white layer to be printed between the first image and second image, to achieve the nominal color profile for the first image.

According to examples, determining the print data on the basis of the white layer, may include adjusting one or more colorimetry properties for the print data to achieve the nominal color profile. For example, since the white layer may not be 100% reflective, the first image that is displayed under reflective conditions may appear duller than it otherwise would do in the case where the image is printed directly on the substrate. Therefore, the print data may appropriately be adjusted for the first image to achieve the nominal color profile for the first image under reflective lighting conditions.

At block 430, second print data for the second image is determined on the basis of the first image data, second image data, the white layer and one or more properties of the substrate to achieve the nominal color profile for the second image.

As with the print data for the first image, determining the print data on the basis of the white layer for the second image, may include adjusting one or more colorimetry properties for the print data to achieve the nominal color profile. In the case of the second image, since the image is printed directly on the substrate, achieving the nominal color profile for the second image under transmissive lighting conditions also takes into account properties of the substrate. According to examples, the print data for the second image is determined to achieve the nominal color profile, taking into account one or more of smoothness, coating, porosity, brightness, whiteness, opacity, gloss, thickness and weight of the substrate on to which the second image is printed.

At block 440, the print data for the first and second images and the white layer is communicated to a printing device to print the first and second images and white layer on the substrate. According to examples, the print data that specifies the white layer between the first and second images may be communicated with the print data for the first and second images or separately as a default setting between printing the second image and, subsequently, the first image.

According to an example, the method 400 further comprises, receiving the first and second print data and controlling a printing device to print the second image according to the second print data on a face of the substrate, a white layer on top of the second image and the first image according to the first print data on the white layer.

According to examples described herein, determining if the color profile of a printed output matches the nominal color profile is performed by measuring color attributes. Values of color attributes may be determined using, for example, a spectrophotometer.

According to examples described herein the methods and systems are used in conjunction with a method for generating a color profile. In one case a test patch is printed without specifying a particular color profile i.e. according to the printing devices default setting. A measurement is performed under reflective lighting conditions, using for example, a spectrophotometer. The nominal color profile for the first image is then determined from the color profile of the test patch as measured by the spectrophotometer under reflective lighting conditions. Next, another separate test patch is printed, and on top of this test patch is printed a white patch followed by the top test image according to the nominal color profile under reflective lighting conditions. Then another measurement of the "sandwich mode" printed test patch is taken under transmissive lighting conditions to determine a nominal color profile for the second image.

The methods and systems described herein are used to print images on a substrate such that the resulting printed out is viewable in both reflective and transmissive lighting conditions. The methods and systems described herein provide a simple an efficient way of printing on a single side of the substrate and avoid the use of double-sided printing techniques. Advantageously this avoids the problems associated to printing images on two sides of a substrate, including misalignment of the images.

Moreover, the methods and systems described herein take into account the properties of the substrate on to which the images are being printed to achieve a nominal color profile under reflective and transmissive lighting conditions. Advantageously, implementing this method allows the substrate to be changed, without the resulting print quality being degraded.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 5:
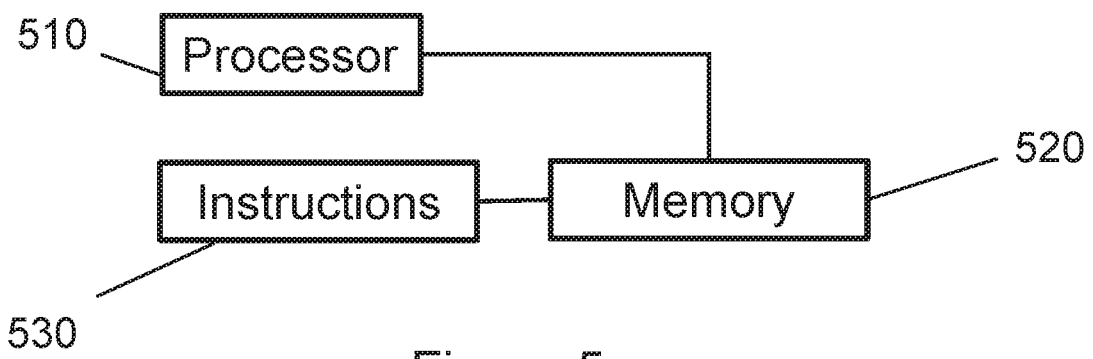
FIG. 5 shows a processor associated with a memory and comprising instructions for generating print data for controlling a printing device according to an example.

FIG. 5 shows an example of a processor 510 associated with a memory 520. The memory 520 comprises computer readable instructions 530 which are executable by the processor 510.

The instructions 530 comprise instruction to: receive first and second image data for first and second images to be printed on a printing medium, wherein the first image data specifies nominal colorimetry attributes of the first image visible on the printing medium when the substrate is viewed under reflective lighting conditions and the second image data specifies a nominal colorimetry attributes for the second image visible on the printing medium when the printing medium is viewed from the same face of the media under transmissive lighting conditions; determine first print data for the first image on the basis of the first image data and a white layer to be printed between the first image and second image, to achieve the nominal color profile for the first image; determine second print data for the second image on the basis of the first image data, second image data, the white layer and one or more properties of the printing medium to achieve the nominal color profile for the second image; and communicate the print data for the first and second images to a printing device to print the first and second images and white layer on the printing medium.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A printing method comprising:
receiving first and second image data for first and second images to be printed on a substrate, wherein the first image data specifies a nominal color profile of the first image visible on the substrate when the substrate is viewed under reflective lighting conditions and the second image data specifies a nominal color profile for the second image visible on the substrate when the substrate is viewed from the same face of the media under transmissive lighting conditions;
determining first print data for the first image on the basis of the first image data and a white layer to be printed between the first image and second image, including adjusting one or multiple colorimetry properties for the first print data, to achieve the nominal color profile for the first image;
determining second print data for the second image on the basis of the first image data, second image data, the white layer and one or more properties of the substrate, including adjusting one or multiple colorimetry properties for the second print data, to achieve the nominal color profile for the second image; and
communicating the first and second print data for the first and second images to a printing device to print the first and second images and white layer on the substrate such that the second print data is printed on the substrate, the white layer is printed on the second print data, and the first print data is printed on the white layer.

2. The method of claim 1 comprising:
receiving the first and second print data;
controlling a printing device to print the second image according to the second print data on a face of the substrate, a white layer on top of the second image and the first image according to the first print data on the white layer.

3. The method of claim 1 wherein the nominal color profile specifies one or more colorimetry attributes.

4. The method of claim 3, comprising determining one or more colorimetry attributes of a printed output to determine if a printed output matches a nominal color profile for the image.

5. The method of claim 4, wherein determining one or more colorimetry attributes of a printed output comprises performing measurements colorimetry attributes with a spectrophotometer.

6. The method of claim 5, wherein the colorimetry attributes comprise saturation, color brightness and hue.

7. The method of claim 1, wherein the substrate properties comprise one or more of: smoothness, coating, porosity, brightness, whiteness, opacity, gloss, thickness and weight.

8. A print controller for a printing device, arranged to:
obtain image data for a first image, the first image being visible when the substrate on to which the image is printed is viewed under reflective lighting conditions;
obtain image data for a second image, the second image being visible when the substrate on to which the image is printed is viewed under transmissive lighting conditions;
generate first print data for the first image on the basis of the first image data and a white layer to be printed between the first image and second image, including adjusting one or multiple colorimetry properties for the first print data to achieve a nominal color profile for the image data for the first image; and
generate second print data for the second image on the basis of the first image data, second image data, the white layer and one or more properties of the substrate, including adjusting one or multiple colorimetry properties for the second print data to achieve a nominal color profile for the image data for the second image, wherein the second print data is to be printed on the substrate, the white layer is to be printed on the second print data, and the first print data is to be printed on the white layer.

9. The apparatus of claim 8, wherein the image data for the first and second images comprises an optimal colorimetry profile of the first and second images, when viewed, respectively, under reflective or transmissive lighting conditions.

10. The apparatus of claim 9, wherein the print control data for the first and second images is generated to achieve respective optimal colorimetry profiles under reflective and transmissive lighting conditions.

11. The apparatus of claim 8 comprising a communications interface arranged to communicate the print control data for the first and second images to a printing device to print the first and second images and white layer on the substrate.

12. A non-transitory machine-readable storage medium encoded with instructions executable by a processor, to:
receive first and second image data for first and second images to be printed on a printing medium, wherein the first image data specifies nominal colorimetry attributes of the first image visible on the printing medium when the substrate is viewed under reflective lighting conditions and the second image data specifies a nominal colorimetry attributes for the second image visible on the printing medium when the printing medium is viewed from the same face of the media under transmissive lighting conditions;
determine first print data for the first image on the basis of the first image data and a white layer to be printed between the first image and second image, including adjusting one or more colorimetry properties for the first print data, to achieve the nominal color profile for the first image;
determine second print data for the second image on the basis of the first image data, second image data, the white layer and one or more properties of the printing medium, including adjusting one or more colorimetry properties for the second print data, to achieve the nominal color profile for the second image; and
communicate the first and second print data for the first and second images to a printing device to print the first and second images and the white layer on the printing medium such that the second print data is printed on the printing medium, the white layer is printed on the second print data, and the first print data is printed on the white layer.

* * * * *